United States Patent
Murata et al.

(10) Patent No.: US 8,283,084 B2
(45) Date of Patent: Oct. 9, 2012

(54) HOLLOW-SHAPED MEMBRANE ELECTRODE ASSEMBLY FOR FUEL CELL AND HOLLOW-TYPE FUEL CELL

(75) Inventors: Shigeaki Murata, Numazu (JP); Haruyuki Nakanishi, Susono (JP); Masahiro Imanishi, Susono (JP); Yoshihisa Tamura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1283 days.

(21) Appl. No.: 11/667,115

(22) PCT Filed: Feb. 3, 2006

(86) PCT No.: PCT/JP2006/302310
§ 371 (c)(1),
(2), (4) Date: May 7, 2007

(87) PCT Pub. No.: WO2006/083037
PCT Pub. Date: Oct. 8, 2006

(65) Prior Publication Data
US 2008/0124597 A1 May 29, 2008

(30) Foreign Application Priority Data

Feb. 4, 2005 (JP) .................. 2005-028525
Nov. 10, 2005 (JP) .................. 2005-326699

(51) Int. Cl.
*H01M 8/04* (2006.01)
*H01M 8/10* (2006.01)
*H01M 8/02* (2006.01)

(52) U.S. Cl. ......... 429/434; 429/483; 429/497; 429/517
(58) Field of Classification Search .................. None
See application file for complete search history.

(56) References Cited

U.S. PATENT DOCUMENTS

| 6,063,517 | A * | 5/2000 | Montemayor et al. ........ 429/492 |
| 6,399,232 | B1 | 6/2002 | Eshraghi |
| 2003/0134169 | A1 * | 7/2003 | Sarkar et al. .................... 429/31 |
| 2003/0134176 | A1 | 7/2003 | Sarkar |
| 2004/0175605 | A1 * | 9/2004 | Eshraghi et al. ................ 429/31 |

FOREIGN PATENT DOCUMENTS

| DE | 199 36 011 A1 | 2/2001 |
| DE | 603 10 371 T2 | 10/2007 |

(Continued)

OTHER PUBLICATIONS

Machine translation of Shibata et al., JP 2004-055368 A.*

(Continued)

*Primary Examiner* — Barbara Gilliam
*Assistant Examiner* — Edu E Enin-Okut
(74) *Attorney, Agent, or Firm* — Oliff & Berridge, PLC

(57) ABSTRACT

There is provided a hollow-shaped membrane electrode assembly for a fuel cell capable of improving power density per unit volume, wherein the hollow-shaped membrane electrode assembly for a fuel cell comprises a hollow solid electrolyte membrane, an outer electrode layer formed on the outer circumferential surface of the solid electrolyte membrane and an inner electrode layer formed on the inner circumferential surface of the solid electrolyte membrane, and wherein the hollow-shaped membrane electrode assembly for a fuel cell is formed in the shape of a spiral.

8 Claims, 11 Drawing Sheets

FOREIGN PATENT DOCUMENTS

| | | |
|---|---|---|
| EP | 1 472 755 B1 | 12/2006 |
| JP | A 7-296840 | 11/1995 |
| JP | A 11-111313 | 4/1999 |
| JP | A 2002-124273 | 4/2002 |
| JP | A 2002-539587 | 11/2002 |
| JP | 2004055368 A * | 2/2004 |
| JP | A 2004-55368 | 2/2004 |
| JP | A 2004-505417 | 2/2004 |
| JP | B2 3621849 | 11/2004 |
| WO | WO 02/09212 A1 | 1/2002 |
| WO | WO 03/062503 A1 | 7/2003 |

OTHER PUBLICATIONS

May 22, 2012 Office Action issued in German Application No. 11 2006 000 121.3 w/translation.

* cited by examiner

HOLLOW-SHAPED MEMBRANE ELECTRODE ASSEMBLY FOR FUEL CELL AND HOLLOW-TYPE FUEL CELL

TECHNICAL FIELD

The present invention relates to a hollow-shaped membrane electrode assembly for a fuel cell which implements cost reduction and its downsizing by being formed in a hollow shape.

The present invention also relates to a hollow-type fuel cell comprising such a membrane electrode assembly, and particularly a hollow-type fuel cell capable of improving a heat exchange efficiency of the membrane electrode assembly.

BACKGROUND ART

As a conventional solid polymer electrolyte fuel cell (hereinafter, it may be simply referred to as a fuel cell), a plane-shaped microcell has mainly been developed, wherein the plane-shaped microcell is produced by disposing catalyst layers to be an anode and a cathode on one surface and the other surface of a plane-shaped solid polymer electrolyte membrane respectively and gas diffusion layers on both sides of the obtained plane-shaped membrane electrode assembly (an assembly comprising the electrolyte membrane and the electrode layers) respectively, further interposing the assembly between plane-shaped separators. A microcell is a minimum power-generation unit of a fuel cell, and a fuel cell stack is obtained by stacking plurality of such plane-shaped microcells.

In order to improve power density of the solid polymer electrolyte fuel cell, a proton conductive polymer membrane with a very thin membrane thickness is used as the solid polymer electrolyte membrane. The membrane thickness is often 10 µm or less, and though a further thin electrolyte membrane is used for improvement of power density, a thickness of the microcell cannot extremely be reduced beyond conventional ones. Similarly, a catalyst layer, a gas diffusion layer, a separator or the like are also undergoing their thickness reduction. However, improvement of power density per unit volume is limited even by the thickness reduction of all members. Hence, demands for compact size may not be fully satisfied in future.

As the separator mentioned above, a sheet-like carbon material which is excellent in corrosion resistance is generally used. The carbon material is expensive itself. In addition, a surface of the separator is often subject to a fine work for forming grooves to be a gas channel in order to evenly supply the fuel gas and the oxidant gas over the entire face of the plane-shaped membrane electrode assembly (an assembly of the electrolyte membrane and the electrode layers). Hence, the separator becomes too expensive due to such fine work and raises a manufacturing cost of the fuel cell.

In addition to the above described problems, the plane-shaped microcell has many problems such that a safe sealing of a periphery of plural microcells which are stacked in order to prevent leakage of the fuel gas and the oxidant gas from the above mentioned gas channel is technically difficult, and such that the power generation efficiency is lowered due to distortion or deformation of the plane-shaped membrane electrode assembly (an assembly of the electrolyte membrane and the electrode layers).

For instance, in order to downsizing the fuel cell described above and to increase a reaction area for generation per unit volume regarding power density, all constituent members described above of the fuel cell are necessary to undergo their thickness reduction. However, in a conventional fuel cell having a plate-like structure, reducing the thickness of each constituent member below a certain value is not preferable from aspects of function and strength and is approaching its limit of design. For example, there are problems such that a commonly used Nafion (product name; manufactured by: DuPont) with the thickness below a certain value has too high gas permeability and produces gas cross leak so as to cause reduction in generated voltage. Hence, improving power density per unit volume above a certain level is structurally difficult in a conventional fuel cell having a plate-like structure.

Accordingly, there are studies to increase power density by composing a fuel cell using a hollow-shaped (for instance, a tube-shaped) membrane electrode assembly, wherein an electrolyte membrane, electrode layers and so on are layered on inner and outer surfaces of a hollow fiber for a hollow-shaped microcell (hereinafter, it may be simply referred to as a hollow-shaped cell). Such a hollow-shaped membrane electrode assembly and a hollow-shaped cell using thereof can significantly improve power density per unit volume in comparison to a conventional fuel cell having a plate-like structure by densely disposing many tubes having small diameters (see Japanese Patent Application Laid-open (JP-A) No. 2002-124273 and JP-A No. Hei. 7(1995)-296840).

Such a fuel cell comprising a hollow-shaped cell does not require a member, which is equivalent to a separator used for a plane-shaped microcell since a hollow of the cell functions as a gas channel. Also, forming an extra gas channel is not necessary since different types of gasses are respectively supplied over the inner and outer surfaces of the hollow-shaped cell. Hence, reduction in production costs is possible. In addition, since the microcell has a three-dimensional form, a specific surface area with respect to volume can be enlarged in comparison to that of a plane-shaped microcell, and improvement in generation power density per volume is expected.

Currently, there are various attempts to improve power density per unit volume of such a tube-shaped membrane electrode assembly and a hollow-shaped cell using thereof.

To obtain desirable output voltage and current, a fuel cell using a hollow-shaped cell has a structure that plurality of hollow-shaped cells are electrically connected and made into a module (a group of hollow-shaped cells) with collector materials, and two or more modules are connected in series and/or in parallel.

In such a module, an adequate number of heat exchanging members (hereinafter, it may be referred to as "cooling pipe") to cool/heat hollow-shaped cells are disposed in parallel with hollow-shaped cells.

This is because types of electrolytes allow the hollow-shaped cell to determine the most suitable temperature range for electrochemical reaction similarly as the microcell comprising a membrane electrode assembly having a plane-like shape (for instance, the temperature is about 100° C. in the case of perfluorocarbon sulfonate membrane). In order to improve power generating performance, the hollow-shaped cell is subject to cooling so as to fix the temperature of the cell in a predetermined range of temperature. On the other hand, from the viewpoint of improving the start-up performance at low temperature of a fuel cell, the hollow-shaped cell requires to be heated when the fuel cell starts. For example, Japanese translation of PCT international application No. 2004-505417 discloses a technique of bundling a plurality of hollow-shaped cells (microcells) to form a modular electrochemical cell assembly and disposing tube-shaped conductive pipes in parallel with and between the microcell bundles. According to the document, the technique enables removal of a large quantity of heat generated by the microcell bundles.

At both ends of the module, a gas manifold to supply hydrogen gas into a hollow of the hollow-shaped cell and a cold water manifold to supply heating medium into a heat exchanging member are provided. Further, a current collector member to collect electric charge generated at each hollow-shaped cell is provided. Hydrogen supplied to the module through the gas manifold on the inlet side is used for an electrochemical reaction while passing through the channel in the hollow of each hollow-shaped cell. Hydrogen or the like which are not used for the electrochemical reaction are collected through the gas manifold on the outlet side. Sealing is applied to the part where a hollow-shaped cell contacts each manifold, which is referred to as a sealing portion. A fuel cell has a structure that only the sealing portions support hollow-shaped cells so that the sealing portions hold the whole weight of hollow-shaped cells. Also, the sealing portions are mostly affected by distortion due to the difference in thermal expansion between the hollow-shaped cell and the manifold. For these reasons, there is a problem that the sealing portions are particularly breakable.

In a conventional fuel cell, as exemplified above, a plurality of linear hollow-shaped cells having the same length as that of a heat exchanging member are disposed in parallel. When one linear hollow-shaped cell is broken due to damage to sealing portions or any other events causing gas leakage, a module containing the damaged hollow-shaped cell becomes unusable. To avoid such a problem, decreasing the number of sealing portions per cell volume is effective.

The number of sealing portions per cell volume can be reduced by making the length of each hollow-shaped cell longer so as to decrease the number of the hollow-shaped cells. However, there are problems that it is difficult to handle a hollow-shaped cell when the hollow-shaped cell is made longer keeping a linear form and strength in the middle portion of the hollow-shaped cell in the axial direction becomes unstable.

The present invention has been achieved in light of the above-mentioned circumstances, and a main object of the present invention is to provide a hollow-shaped membrane electrode assembly for a fuel cell which is capable of improving power density per unit volume and easy to handle.

Another object of the present invention is to provide a fuel cell using a hollow-shaped membrane electrode assembly for a fuel cell which is capable of improving power density per unit volume, wherein the number of sealing portions per cell volume can be reduced without sacrificing easiness of handling of the hollow-shaped cell using the hollow-shaped membrane electrode assembly and strength in the middle portion of the hollow-shaped cell in the axial direction.

DISCLOSURE OF INVENTION

In order to achieve the object described above, the present invention provides a hollow-shaped membrane electrode assembly for a fuel cell comprising a solid electrolyte membrane in a hollow shape, an outer electrode layer formed on the outer circumferential surface of the solid electrolyte membrane and an inner electrode layer formed on the inner circumferential surface of the solid electrolyte membrane, wherein the hollow-shaped membrane electrode assembly for a fuel cell is formed in the shape of a spiral.

The hollow-shaped membrane electrode assembly for a fuel cell of the present invention (hereinafter, it may be simply referred to as "membrane electrode assembly") can be disposed densely in a given space since it is formed in the shape of a spiral. Thereby, electrode area per unit volume can be increased substantially so that power density per unit volume when used as a fuel cell can be improved.

Particularly, in the present invention, the membrane electrode assembly is formed in the shape of a spiral; therefore, the membrane electrode assembly can be disposed evenly and densely in a given space.

Also, in the present invention, it is preferable that the hollow-shaped membrane electrode assembly for a fuel cell has an outer current collector disposed on the outer circumferential surface of the outer electrode layer and an inner current collector disposed on the inner circumferential surface of the inner electrode layer. Hence, it is able to improve current collection performance of the membrane electrode assembly formed in the shape of a spiral.

Also, in the present invention, it is preferable that the hollow-shaped solid electrolyte membrane is a tubular solid electrolyte membrane.

In addition, the present invention provides a hollow-type fuel cell comprising a hollow-shaped cell using the above-mentioned hollow-shaped membrane electrode assembly for a fuel cell. By forming a fuel cell using the membrane electrode assembly, a fuel cell with high power density per unit volume is obtainable.

Also, it is preferable that the hollow-type fuel cell of the present invention further comprises a rod-like member, and the hollow-shaped cell is disposed in a spirally winding manner around the outside of the rod-like member. By such a structure, a fuel cell, wherein modules can be easily handled and damage to the sealing portions can be avoided, can be provided while making the length of each hollow-shaped cell longer and reducing the number of the sealing portions per cell volume.

In the hollow-type fuel cell of the present invention comprising the rod-like member, it is preferable that a contact length of the hollow-shaped cell and the rod-like member is 1.5 to 10 times longer than the total length of the rod-like member.

Also, in the hollow-type fuel cell of the present invention comprising the rod-like member, it is preferable that the rod-like member is a heat exchanging member to control a temperature of the hollow-shaped cell.

Also, in the hollow-type fuel cell of the present invention comprising the rod-like member, it is preferable that the rod-like member has an electrical conducting property and functions as a current collector of an outer electrode layer formed on the outer circumferential surface of the solid electrolyte membrane.

Also, in the hollow-type fuel cell of the present invention comprising the rod-like member, it is preferable that the rod-like member is the heat exchanging member and functions as the current collector.

Also, in the hollow-type fuel cell of the present invention comprising the rod-like member, it is preferable that a heating medium flows inside the heat exchanging member and at least a part of the inner surface of the heat exchanging member which contacts the heating medium is made of a material having an electrical insulating property.

Also, in the hollow-type fuel cell of the present invention comprising the rod-like member, it is preferable that a gas channel is formed on the outer circumferential surface of the rod-like member.

Effect of a membrane electrode assembly of the present invention is that electrode area per unit volume can be increased and power density per unit volume can be improved.

In addition, in the embodiment that a hollow-shaped cell is disposed in a spirally winding manner around a rod-like member, a spiral form of the hollow-shaped cell can be more stably maintained so as to avoid excess weight to the sealing portions at both ends of the hollow-type fuel cell. Hence, it is possible to provide a fuel cell comprising a hollow-shaped cell having an increase in length and a decrease in the number of sealing portions per cell volume and thereby capable of avoiding damage to the sealing portions.

In addition, in the embodiment that the rod-like member functions as a heat exchanging member and a conducting material, it is possible to reduce the number of members and to downsize the module (a group of hollow-shaped cells).

BRIEF DESCRIPTION OF DRAWINGS

In the accompanying drawings.

The sign in each figure refers to the following: 1: a membrane electrode assembly, 2: an inner current collector, 3: an inner electrode layer, 4: a solid electrolyte membrane, 5: an outer electrode layer, 6: an outer current collector, 7: a channel inside of a hollow, 10: a rod-like member (a heat exchanging member), 11: a hollow-shaped cell, 12: a lateral gas channel, 13: an axial gas channel, 14: a heat medium channel, 90: a heat exchanging member (a cooling pipe), 91: a hollow-shaped cell, 92: an inner current collector, 98a and 98b: gas manifolds, 99a and 99b: cold water manifolds, 100: a hollow-type module, 500: a reaction gas inlet, 510: a reaction gas outlet, 520: a cooling water inlet/outlet, 600: a cartridge, and 601: a hollow-type fuel cell.

BEST MODE FOR CARRYING OUT THE INVENTION

A First Embodiment

A first embodiment of the present invention relates a membrane electrode assembly for a tube-type fuel cell formed in the shape of a spiral and a tube-type fuel cell using thereof. Hereinafter, the membrane electrode assembly and the fuel cell will be described separately.

A. Hollow-Shaped Membrane Electrode Assembly for Fuel Cell

First, a hollow-shaped membrane electrode assembly for a fuel cell according to the present invention will be described.

The membrane electrode assembly of the present invention is characterized by being formed in the shape of a spiral. Hereinafter, such a membrane electrode assembly of the present invention will be specifically described in reference to drawings.

Figure 1:
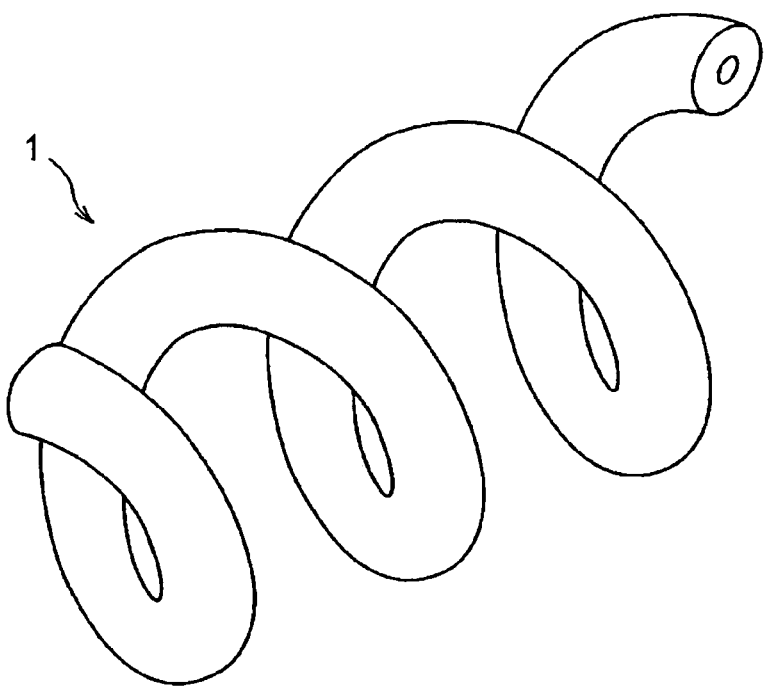
FIG. 1 is a schematic perspective view showing an example of a membrane electrode assembly of the present invention.
Figure 2:
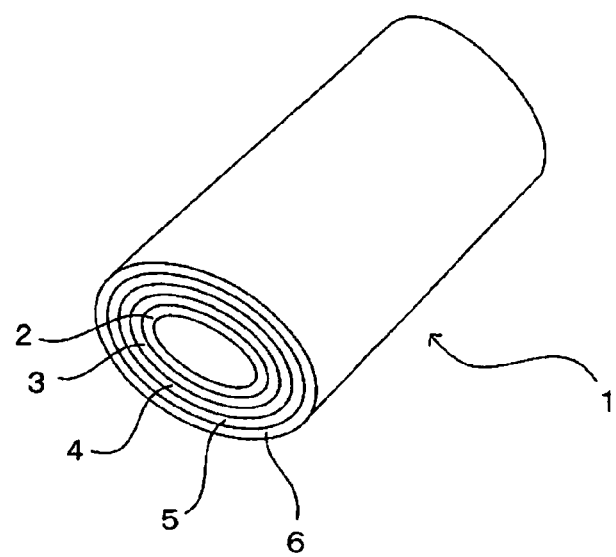
FIG. 2 is a schematic perspective view showing an example of a plane vertical to an axis of a tube-shaped membrane electrode assembly of the present invention.

FIG. 1 is a schematic perspective view showing an example of a membrane electrode assembly of the present invention. As shown in FIG. 1, the membrane electrode assembly 1 of the present invention has a tubular shape, and an axis of the tube-shaped membrane electrode assembly is formed to be in the shape of a spiral. FIG. 2 is a schematic perspective view showing an example of a plane vertical to an axis of a tube-shaped membrane electrode assembly of the present invention. As shown in FIG. 2, the center of the membrane electrode assembly 1 of the present invention is hollow, and an inner current collector 2, an inner electrode layer 3, a solid electrolyte membrane 4, an outer electrode layer 5, and an outer current collector 6 are disposed on the axis in this order.

In the present invention, the membrane electrode assembly can be disposed densely in a given space since the membrane electrode assembly is formed in the shape of a spiral. Thereby, electrode area per unit volume can be increased so that power density per unit volume can be improved.

When current flows in a spiral-shaped conductive material, a magnetic field is produced. If no conductive material such as a rod-like member to be hereinafter described is disposed inside of the spiral-shaped conductor, molecules of water and oxygen in the membrane electrode assembly are affected by the magnetic field and activate the movement of the molecules. As a result, effects such as improvements in diffusivity of an oxygen molecule in an electrode layer, mobility of a water molecule in a solid electrolyte membrane or an electrode layer, water molecule discharging ability inside of a channel and so on can be obtained.

Hereinafter, a form, structure and production method of the hollow-shaped membrane electrode assembly for a fuel cell according to a first embodiment of the present invention will be respectively explained in detail.

1. Form of Hollow-Shaped Membrane Electrode Assembly for Fuel Cell

In the present invention, the membrane electrode assembly can be disposed evenly in a given space by forming the membrane electrode assembly into a shape like a spiral which is a form changing regularly. Also, it is able to maintain a smooth flow of fluid which flows inside of the membrane electrode assembly by forming the membrane electrode assembly into a rounded shape without any angles. In addition, by forming the membrane electrode assembly in the shape of a spiral, the above-described effect that generation of a magnetic field thereby activates movements of water and oxygen can be obtained.

Figure 3:
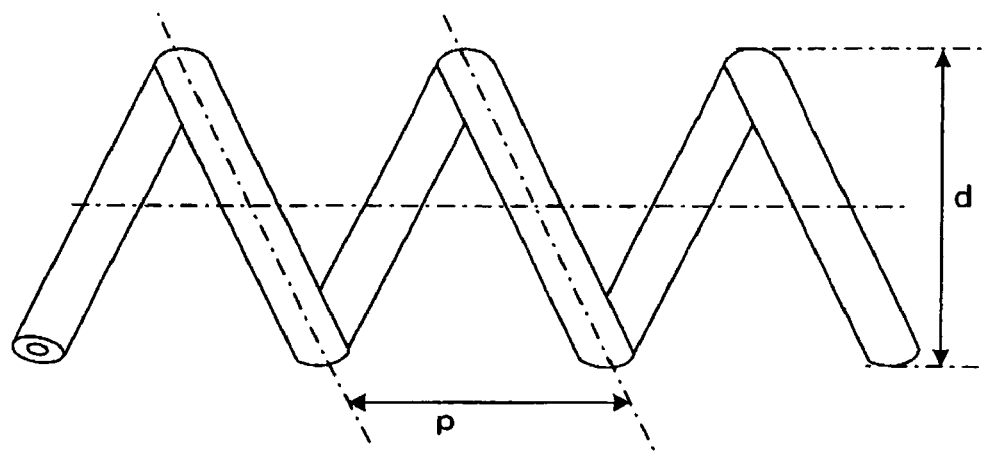
FIG. 3 is an explanatory diagram showing an example of a size of a membrane electrode assembly of the present invention.

There is no particular limitation to the spiral shape. As far as the shape is spiral, diameter and a pitch thereof can be fixed or even varied. Herein, the diameter of the spiral shape is a length "d" in the direction vertical to the axis of the spiral shape shown in FIG. 3 and also means the outermost diameter of the spiral shape. A pitch of the spiral shape is a length "p" in FIG. 3, and means, in the hollow-shaped membrane electrode assembly formed in the shape of a spiral, a distance between the center lines of the adjacent hollow-shaped membrane electrode assemblies.

In the present invention, the spiral shape having a constant diameter and pitch is preferable among the above-mentioned spiral shapes. The diameter is preferably in the range from 500 to 3,000 µm and more preferably from 2,000 to 2,500 µm. The pitch of the spiral shape is preferably in the range from 500 to 3,000 µm and more preferably 1,000 to 2,000 µm. In addition, the outside diameter of the hollow-shaped membrane electrode assembly to be formed into such a spiral is preferably in the range from 500 to 2,000 µm and more preferably from 800 to 1,200 µm. By forming the hollow-shaped membrane electrode assembly into such a spiral, the membrane electrode assembly can be disposed evenly and densely in a given space.

It is preferable that the pitch of the spiral shape in the first embodiment is larger than the outside diameter of the hollow-shaped membrane electrode assembly, that is, it is preferable in the hollow-shaped membrane electrode assembly formed into a spiral that adjacent membrane electrode assemblies are not in contact with each other. By allowing adjacent membrane electrode assemblies not to be in contact with each other and producing spaces between membrane electrode assemblies, it is able to obtain enough areas where gas or water channels using the outer space of the membrane electrode assembly are allowed to be in contact with the membrane electrode assembly. Thereby, supplies of the fuel and oxidant gases and discharging of produced water are performed smoothly.

2. Structure of Hollow-Shaped Membrane Electrode Assembly for Fuel Cell

There is no particular limitation to the hollow-shaped membrane electrode assembly used in the present invention and a general hollow-shaped membrane electrode assembly may be used. As a structure of a general hollow-shaped membrane electrode assembly, for example, there may be a membrane electrode assembly comprising a hollow solid electrolyte membrane, an outer electrode layer formed on the outer circumferential surface of the solid electrolyte membrane and an inner electrode layer formed on the inner circumferential surface of the solid electrolyte membrane or the like. An outer current collector may be disposed on the outer circumferential surface of said outer electrode layer, and/or an inner current collector may be disposed on the inner circumferential surface of (said inner catalyst layer), if required. As each electrode layer disposed on the inner and outer circumferential surfaces of the electrolyte membrane, generally an electrode layer composed by laying a catalyst layer and a gas diffusion layer in this order from an electrolyte membrane side is used.

Hereinafter, constituents of the membrane electrode assembly which can be used in the present invention will be described respectively.

There is no particular limitation to the solid electrolyte membrane used in the present invention as far as a solid electrolyte membrane is in a hollow shape, excellent in proton conductivity and made of nonconductive material. A representative example of a hollow shape is a tubular shape but may not be limited thereto.

As the electrolyte material comprising such a solid electrolyte membrane, there may be fluorine resins, a typical example of which is Nafion (product name; manufactured by: DuPont), organic materials such as hydrocarbon resins or the like, a typical example of which is amide resins, inorganic materials such as silica oxide-based materials or the like.

As the solid electrolyte membranes using the inorganic electrolyte material, there may be a tubular solid electrolyte membrane produced in such a manner that porous glass is formed into a tubular shape and nanopore surface of which is subject to modification to provide proton conductivity, a solid electrolyte membrane based on tubular phosphate glass or the like.

As the solid electrolyte membrane using the porous glass, there may be, for example, a solid electrolyte membrane produced by a method wherein an OH group on a pore surface of the porous glass is reacted with a silane coupling agent of mercaptopropyltrimethoxysilane followed by oxidizing —SH of a mercapto group so as to introduce a sulfonic acid group having proton conductivity ("CHEMISTRY & CHEMICAL INDUSTRY", Vol. 57, No. 1, 2004, pp. 41-44) or the like. As the solid electrolyte membrane applying the phosphate glass, there may be an example reported in "The Journal of Fuel Cell Technology", Vol. 3, No. 3, 2004, pp. 69-71, or the like.

There is no particular limitation to the outer electrode layer and the inner electrode layer used in the present invention. A material generally used for a membrane electrode assembly for a fuel cell having a plane-like structure which is shaped into a tube can be used. Specifically, there may be proton conductive materials such as perfluorosulfonic polymer (product name: Nafion; manufactured by: DuPont) or the like, conductive materials such as carbon black, carbon nanotube or the like and materials containing a catalyst such as platinum or the like supported by the conductive materials.

In the membrane electrode assembly used in the present invention, there is no particular limitation to a method of collecting electrical power generated by a power generation reaction. A method of collecting electrical power which is generally employed in a hollow-shaped membrane electrode assembly may be used. For instance, a member which functions both as an electrode layer and a current collector may be used as the inner electrode layer and the inner current collector or as the outer electrode layer and the outer current collector. Also, a member which is different from the electrode layer may be used as the current collector so that the inner current collector may be formed inside of the inner electrode layer and/or the outer current collector may be formed outside of the outer electrode layer.

Among them, the membrane electrode assembly of the present invention preferably has the outer current collector disposed on the outer circumferential surface of the outer electrode layer and the inner current collector disposed on the inner circumferential surface of the inner electrode layer. By using the current collector which is a different member from the electrode layer and allowing the electrode layer to be closely in contact with the current collector which is high in conductivity, an electron can move smoothly so as to be able to collect electrical power efficiently.

There is no particular limitation to the inner and outer current collectors if the collectors are high in conductivity and allow gas to permeate in the diameter direction of the tube-shaped membrane electrode assembly. As examples of the shape of such inner and outer current collectors, there may be a current collector in the shape of a coil spring, a collector, a tubal wall of which has many through-holes, a collector, a tubal wall of which has a net-like structure, a collector with plurality of linear conductive materials disposed in the axial direction of the tube-shaped membrane electrode assembly or the like. Among them, the current collector in the shape of a coil spring may be suitably used. Also, as a material to form the inner current collector and the outer current collector in such shapes, there may be, for instance, carbon or metal such as stainless steel, titanium, platinum, gold, TiC, $TiSi_2$, $SiO_2$, $B_2O_3$, $Nd_2O$, $TiB_2$ or the like.

3. Method of Production

There is no particular limitation to a method of producing the membrane electrode assembly in the shape of a spiral of the present invention if the membrane electrode assembly which has a hollow shape, and an axis of which is formed to be a spiral can be produced. As such a method, there may be, for example, a method of producing a spiral of a hollow-shaped membrane electrode assembly from the beginning (a first method), a method of producing a linear hollow-shaped membrane electrode assembly followed by forming the hollow-shaped membrane electrode assembly into a spiral (a second method) or the like.

In the case of producing the membrane electrode assembly of the present invention by the first method, the solid electrolyte membrane in the shape of a spiral can be produced in such a manner that firstly a solid electrolyte membrane is formed in the shape of a desired spiral and then electrode layers are formed on the inner and outer circumferential surfaces of the solid electrolyte membrane by dipping or the like. If required, an inner and/or outer current collector may be provided. It is, able to form the solid electrolyte membrane into the shape of a desired spiral by melt extrusion in the case of using a material which is suitable for melt extrusion such as an inorganic material including silicon oxide-based material or the like as the material for forming the solid electrode membrane among materials mentioned in "2. Structure of hollow-shaped membrane electrode assembly for fuel cell". In the case of using materials which are not suitable for the melt extrusion such as a fluorine resin as typified by Nafion (product name; manufactured by: DuPont) or the like or an organic material such as a hydrocarbon resin or the like as typified by an amino resin, the solid electrolyte membrane in the shape of a desired spiral can be formed with the use of a mold in the shape of the desired spiral.

According to the first method, the membrane electrode assembly can be also produced by forming an inner current collector, which is the innermost layer of the membrane electrode assembly (or an inner electrode layer if no inner current collector is provided) into the shape of a desired spiral and stacking each member of the membrane electrode assembly thereon sequentially in layers.

In the case of producing the membrane electrode assembly of the present invention by the second method, firstly a hollow-shaped membrane electrode assembly is produced in a linear form. There is no particular limitation to the method of producing such a linear hollow-shaped membrane electrode assembly and may be produced in a general method. Next, the linear hollow-shaped membrane electrode assembly is formed into a spiral. To form a hollow-shaped membrane electrode assembly into a spiral, for example, there is a method that the membrane electrode assembly is disposed in a spirally winding manner around a rod-like material having a certain level of stiffness. An inner and/or outer current collector may be disposed after forming the membrane electrode assembly into a spiral. Or the inner and/or outer current collector may be provided when producing a linear hollow-shaped membrane electrode assembly, which is then formed into the shape of a spiral. In the case of producing the membrane electrode assembly according to the second method, a material having plasticity is preferably used for a material of each constituent member of the membrane electrode assembly among the materials mentioned in "2. Structure of hollow-shaped membrane electrode assembly for fuel cell". By producing the membrane electrode assembly with materials having plasticity, damage to constituent members and so on which may occur in the process of forming a hollow-shaped membrane electrode assembly into a spiral can be prevented.

Figure 4:
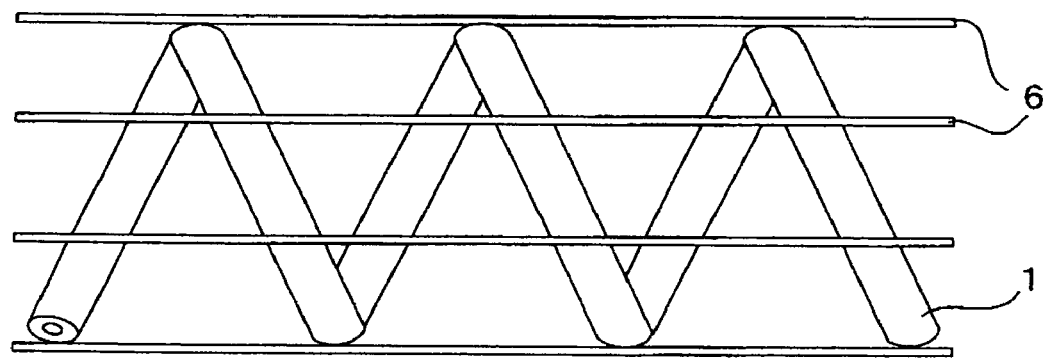
FIG. 4 is a schematic diagram showing another example of a membrane electrode assembly of the present invention.

As shown in FIG. 4, electrical power collection can be performed outside of the above-described spiral-shaped membrane electrode assembly by an outer current collector 6, a shape of which does not fit along the spiral-shaped membrane electrode assembly.

B. Hollow-Type Fuel Cell

A hollow-type fuel cell of the present invention is characterized in that the hollow-type fuel cell comprises the hollow-shaped cell using the above-described hollow-shaped membrane electrode assembly for a fuel cell. Since the hollow-type fuel cell of the present invention comprises a microcell, which is a minimum power-generation unit and uses the membrane electrode assembly described in "A. Hollow-shaped membrane electrode assembly for fuel cell" which can increase electrode area per unit volume, a hollow-type fuel cell with high power density per unit volume can be obtained. The membrane electrode assembly used for the hollow-type fuel cell of the present invention is similar as the membrane mentioned in "A. Hollow-shaped membrane electrode assembly for fuel cell", thus a description thereof will be omitted.

A Second Embodiment

A second embodiment of the present invention relates to a hollow-type fuel cell comprising the hollow-type fuel cell mentioned in "B. Hollow-type fuel cell" and further comprising a rod-like member, wherein the hollow-shaped cell is disposed in a spirally winding manner around the outside of the rod-like member.

Hereinafter, the second embodiment of the present invention will be explained in detail with reference to figures focusing on different aspects from the first embodiment. The following embodiment will explain a case that a heat exchanging member functions as a cooling pipe by supplying a cooling medium to the inside of the heat exchanging member. However, a hollow-shaped cell can also function as a heat exchanging member capable of providing heat by supplying a heating medium to the inside of the heat exchanging member. Also, the following embodiment will particularly explain a solid polymer type fuel cell which uses a hydrogen gas as a fuel and air (oxygen) as an oxidizer, but the present invention may not be limited to the embodiment.

Figure 5:
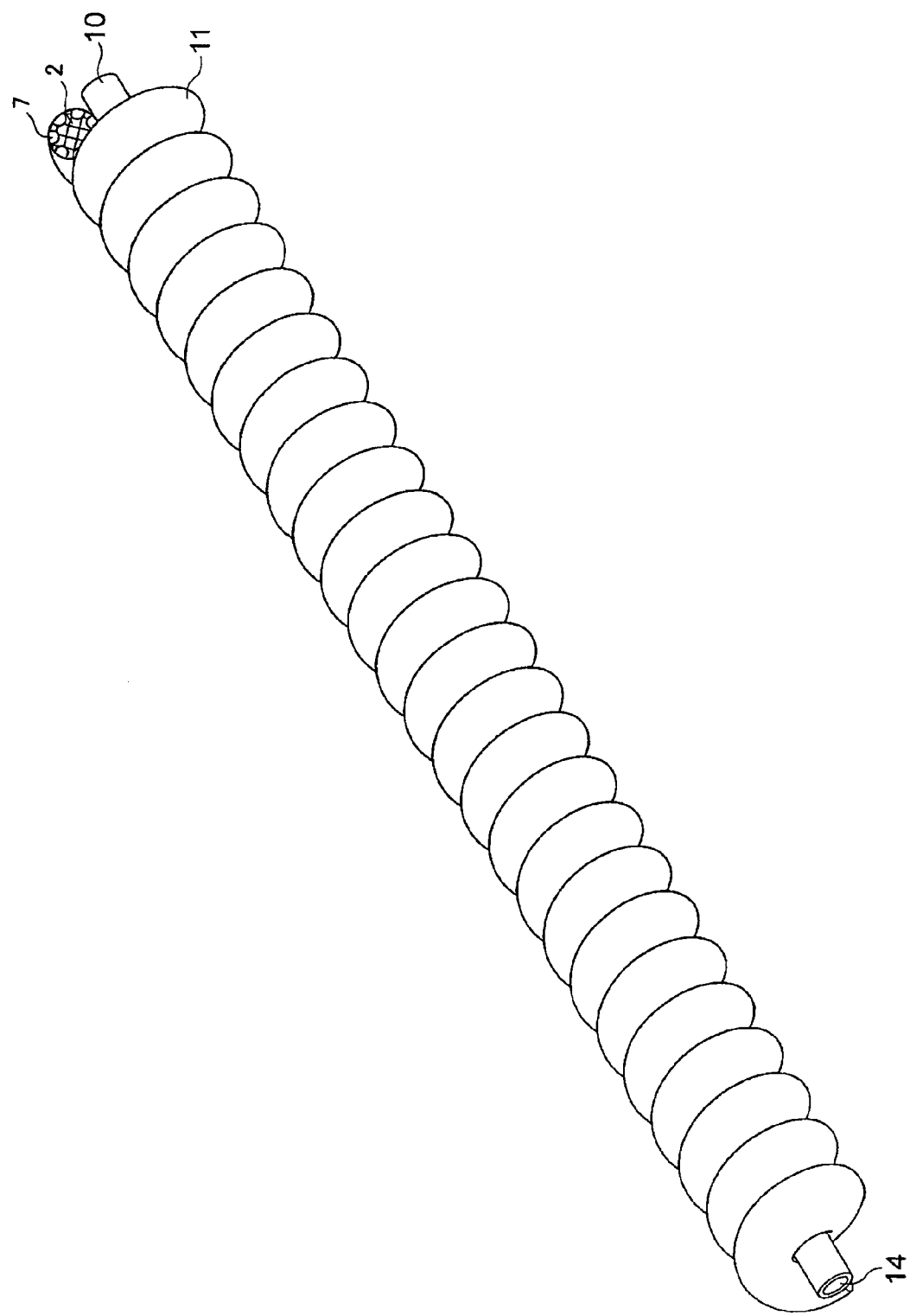
FIG. 5 is a schematic perspective view showing one embodiment of a hollow-shaped cell and a rod-like member of the present invention.
Figure 15:
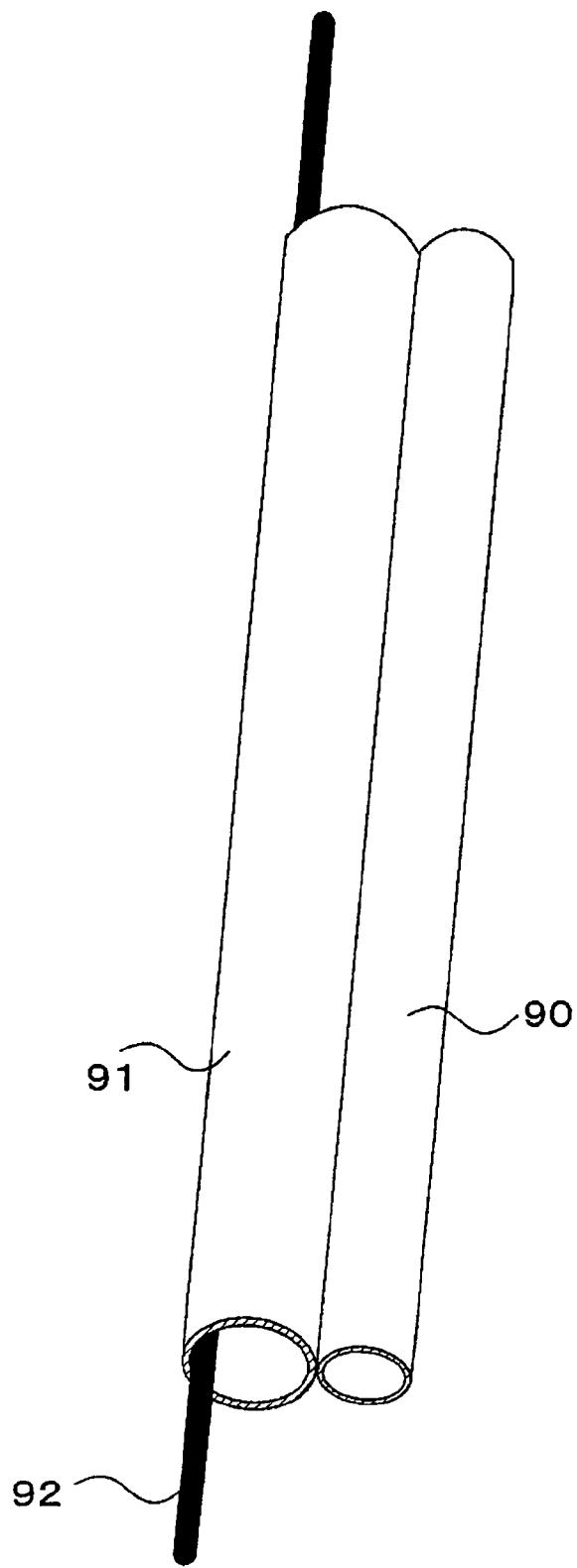
FIG. 15 is a schematic perspective view showing one embodiment of a conventional tube-shaped membrane electrode assembly.

FIG. 5 is a schematic perspective view showing one embodiment of a hollow-shaped cell and a rod-like member of the present invention. As an embodiment shown in FIG. 15, a conventional hollow-shaped cell 91 has a linear shape and is disposed in parallel with a rod-like member 90 such as a cooling pipe or the like so that the length of the conventional hollow-shaped cell 91 in the axial direction is almost the same as the length in the axial direction of the rod-like member 90 such as a cooling pipe or the like. On the other hand, a hollow-shaped cell 11 of the present invention is disposed spirally outside of the rod-like member 10 as shown in FIG. 5. Hence, the length of the hollow-shaped cell 11 (the length of contact "a contact length" between the hollow-shaped cell 11 and the rod-like member 10) can be extended longer than the total length of the rod-like member 10. Specifically, the length of the hollow-shaped cell can be 1.5 to 10 times longer than the total length of the rod-like member 10. The contact length can be calculated from:

the number of turns of the hollow-shaped cell×the outer circumference of the rod-like member.

Figure 6:
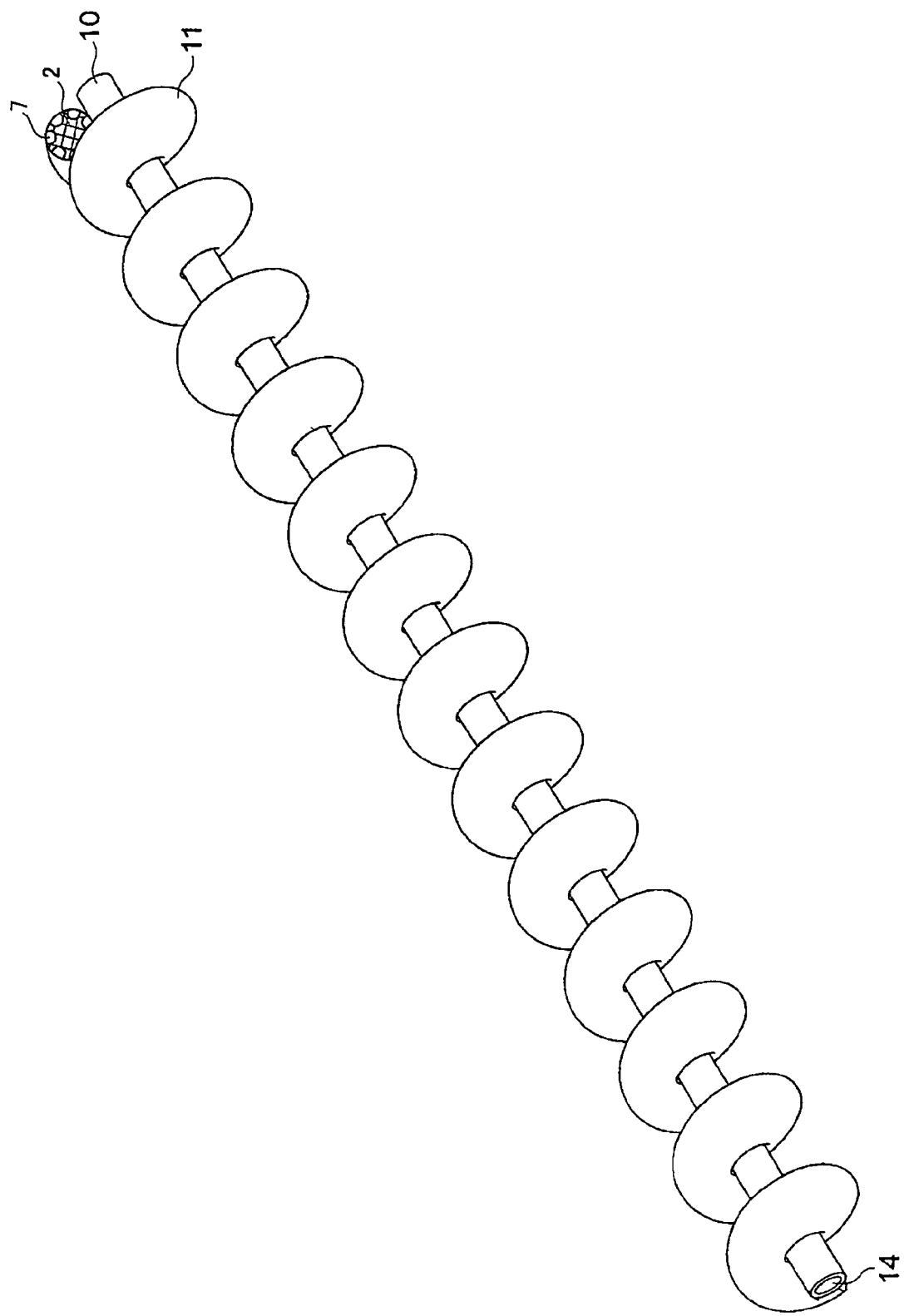
FIG. 6 is a schematic perspective view showing one embodiment of a hollow-shaped cell and a rod-like member of the present invention.

The hollow-shaped cell 11, which is spirally disposed outside of the rod-like member 10, may be closely disposed without any spaces as shown in FIG. 5 or may be disposed with spaces so as to allow the pitch of the spiral to be 0.1 to 1 mm as shown in FIG. 6.

Figure 7:
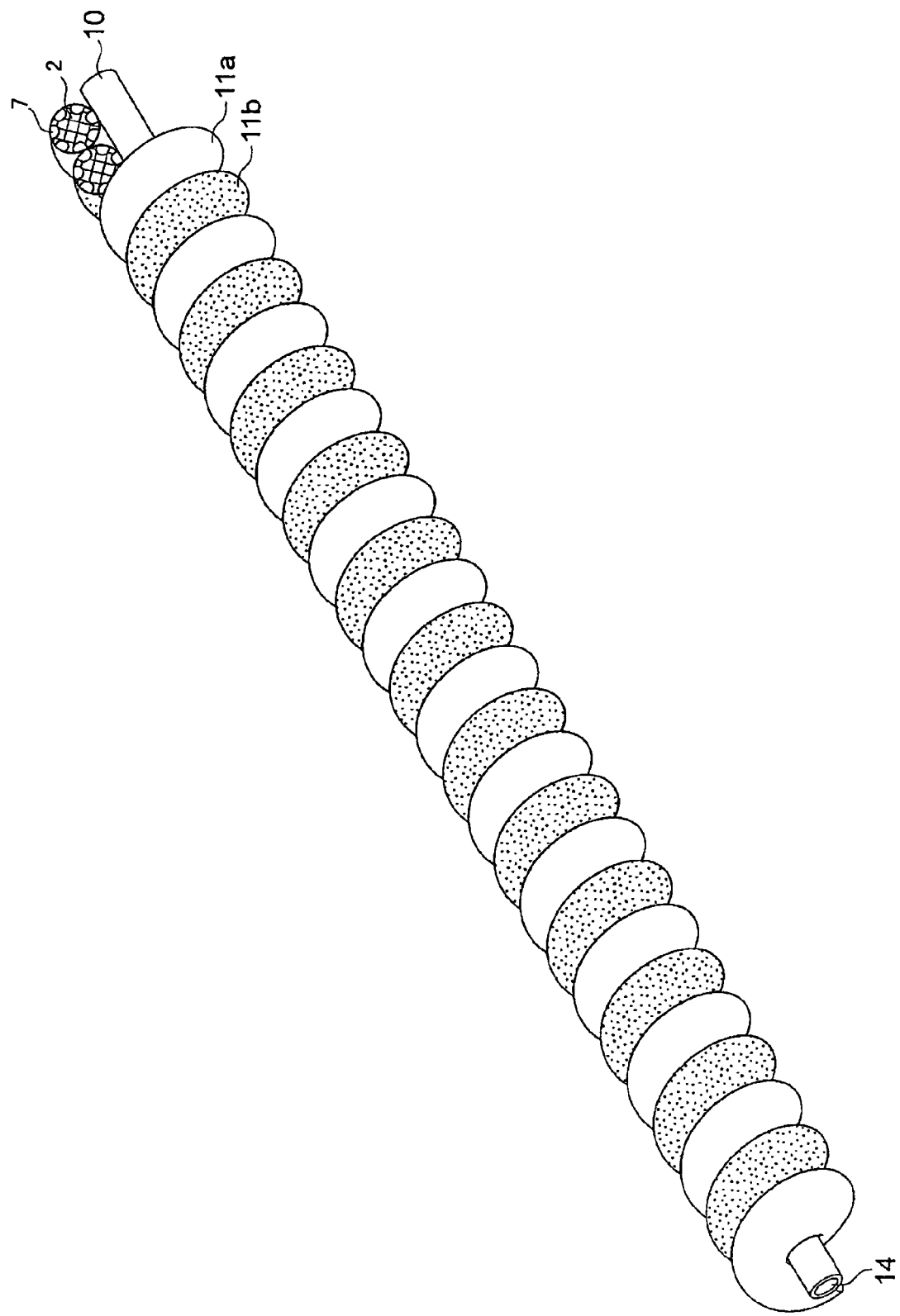
FIG. 7 is a schematic perspective view showing one embodiment of a hollow-shaped cell and a rod-like member of the present invention.

Also, as shown in FIG. 7, plurality of hollow-shaped cells may be disposed in parallel and in a spirally winding manner around the outside of the rod-like member.

As a processing method to spirally dispose the membrane electrode assembly on the rod-like member, a bobbin winding method disclosed in Japanese Patent Application Laid-open (JP-A) No. 2004-22165 or the like can be exemplified.

Hereinafter, constituent members featured in the second embodiment will be respectively explained in detail.
(Hollow-Shaped Cell in the Second Embodiment)

The hollow-shaped cell 11 of the second embodiment comprises at least a hollow electrolyte membrane and a pair of electrodes disposed inner and outer surfaces of the electrolyte membrane. Materials comprising members of the hollow-shaped cell 11 may not be particularly limited if materials are flexible to be spirally disposed around the axis of the rod-like member and a method of the production may also not be limited. An embodiment will be exemplified below.

Figure 8:
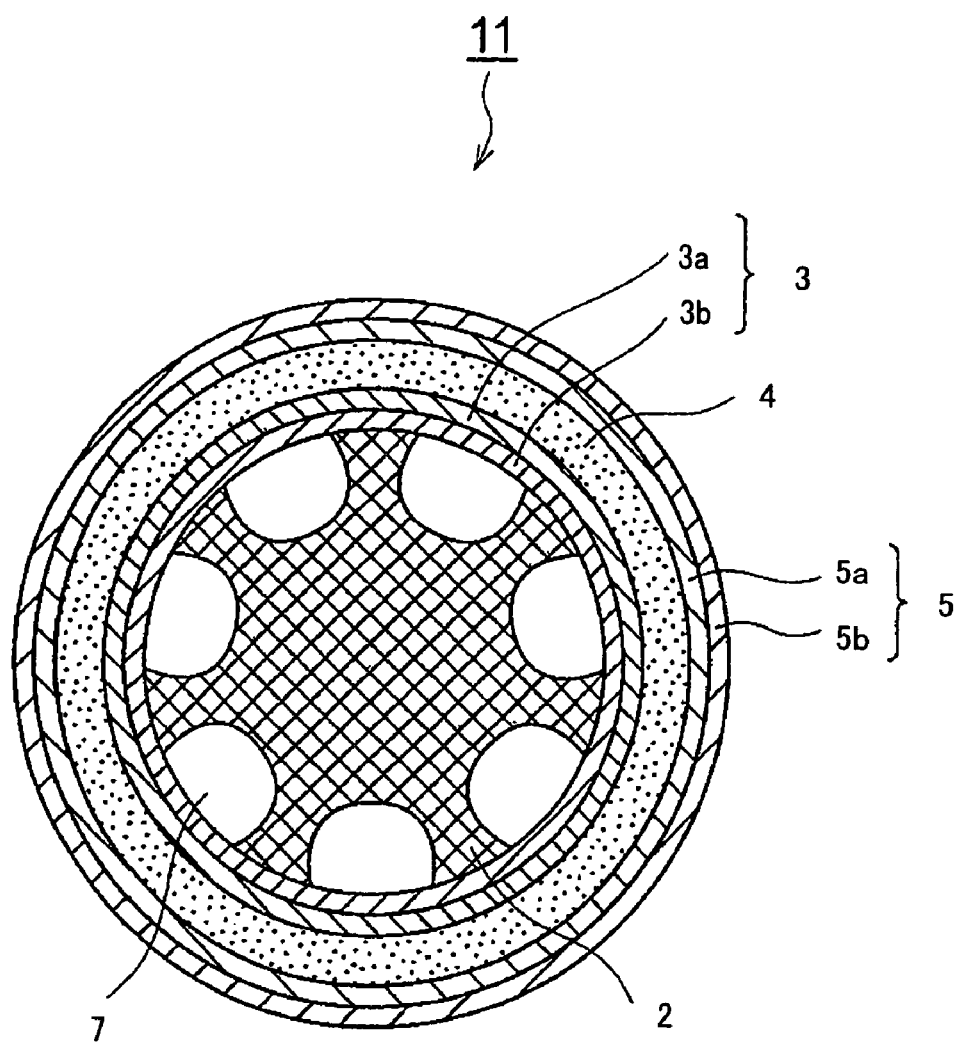
FIG. 8 is a sectional view showing one embodiment of a hollow-shaped cell of the present invention.
Figure 9:
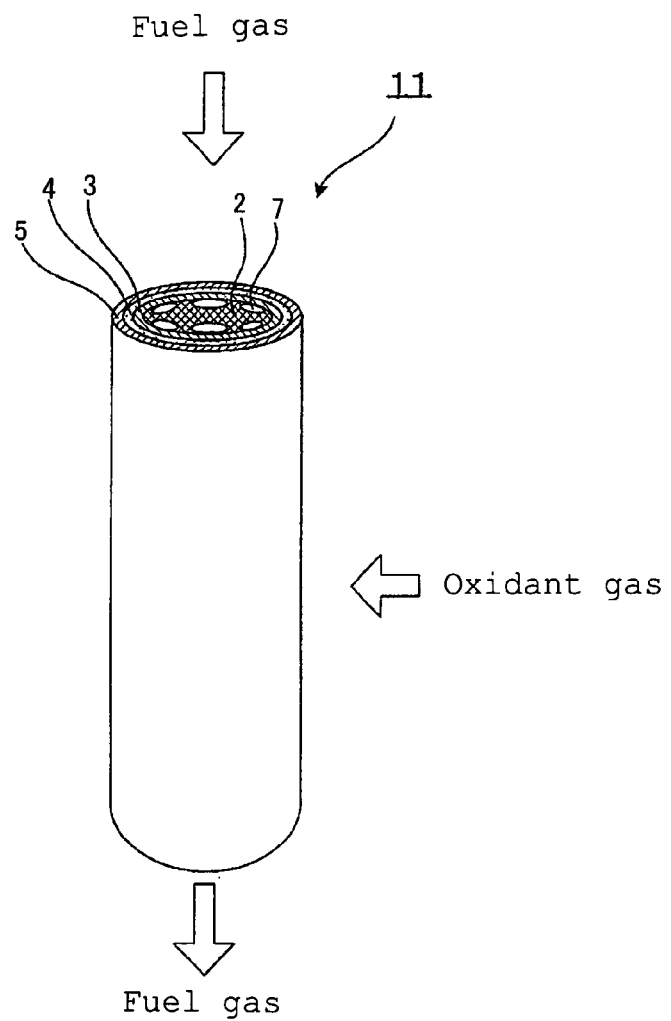
FIG. 9 is a schematic perspective view showing one embodiment of a hollow-shaped cell of the present invention.

FIG. 8 is a sectional view of the hollow-shaped cell used in the fuel cell of the second embodiment, and FIG. 9 is a schematic perspective of the same hollow-shaped cell. Hollow-shaped cell 11 has a hollow solid polymer electrolyte membrane 4 (perfluorocarbon sulfonic acid membrane), an inner electrode layer 3 disposed on the inside of the solid polymer electrolyte membrane 4 (a fuel electrode to be an anode in the present embodiment) and the outer electrode layer 5 (an air electrode to be a cathode in the present embodiment) disposed on the outside. The hollow portion is a channel inside of the hollow 7, and a fuel gas ($H_2$) is supplied through the channel as a reaction gas. A current collector 2 on a negative electrode side (an anode side) is disposed in closely contact with a surface of the anode 3. A collector material on a positive electrode side (a cathode side) can be provided on an outer surface of the cathode 5. However, as explained below, it is preferable that the rod-like member 10 also functions as the current collector on the positive electrode side as the outer current collector.

The hollow-shaped cell 11 having such a structure is disposed around the outer circumferential surface of the rod-like member 10 in a spirally winding manner. If necessary, the hollow-shaped cell is fixed on the rod-like member 10 with the use of a heat-resistant adhesive material such as a silicon-based adhesive material, an epoxy-based adhesive material or the like. By supplying the hydrogen gas to the inside of the hollow 7 of the hollow-shaped cell 11 and the air to the outside of the cell 11, a fuel or an oxidant is supplied to the anode or the cathode (the air electrode) so as to generate the power.

The hollow-shaped cell 11 may be in a state that one end of a hollow portion (a tube) is closed and the other end of the same is opened, provided that a reaction gas can be sufficiently supplied to the inside of the hollow electrolyte membrane 4. As a method to close one end of the hollow-shaped cell, it may be a method to put a resin or the like into one end of the hollow but may not be particularly limited.

Though an inside diameter, an outside diameter, a length or the like of the hollow solid polymer electrolyte membrane 4 is not particularly limited, the outside diameter of the solid polymer electrolyte membrane 4 is preferably in the range of 0.01 to 10 mm, more preferably 0.1 to 1 mm, still more preferably 0.1 to 0.5 mm. The hollow electrolyte membrane 4 with less than 0.01 mm of the outside diameter is difficult to be produced at present due to a technical problem. On the other hand, the hollow electrolyte membrane 4 with more than 10 mm of the outside diameter does not increase a surface area with respect to an occupied volume, hence an obtained hollow-shaped cell may not provide a sufficient output per unit volume.

Though a perfluorocarbon sulfonic acid membrane is preferably thin from the viewpoint of improving proton conductivity, significantly much thin membrane decreases a function to separate gases and increases a permeating amount of non-proton hydrogen. However, a fuel cell produced by gathering a large number of hollow-shaped cell modules is able to have a large electrode area in comparison with a conventional fuel cell in which plane-shaped microcells for the fuel cell are stacked, thereby it can provide a sufficient output even if a rather thick membrane is used. From the viewpoint, a thickness of the perfluorocarbon sulfonic acid membrane is preferably 10 to 100 μm, more preferably 50 to 60 μm, still more preferably 50 to 55 μm.

Further in consideration of the above described preferable ranges of the outside diameter and the membrane thickness, a preferable range of an inside diameter is 0.01 to 10 mm, more preferably 0.1 to 1 mm, still more preferably 0.1 to 0.5 mm.

The hollow-shaped cell of the embodiment shown in FIG. 8 has a tubular electrolyte membrane. However, the solid electrolyte membrane in the present invention is not limited to a tubular shape, and it may be a membrane having a hollow portion and capable of inpour of the fuel or the oxidant into the hollow to supply a reactant substance necessary for an electrochemical reaction to the electrode provided inside of the hollow.

There are many advantages as the hollow-shaped cell 11 is in a hollow shape. Substantial advantages are that a separator is no longer required and a large electrode area for power generation can be obtained.

Since the hollow-type fuel cell according to the second embodiment has the hollow-shaped cell, the fuel cell of the present invention can have a large electrode area per unit volume in comparison with a fuel cell having the plane-shaped microcell. Therefore, even if a solid polymer electrolyte membrane to be used is an electrolyte membrane having proton conductivity not so higher than that of the perfluorocarbon sulfonic acid membrane, a fuel cell having a high power density per unit volume can be obtained.

As a solid polymer electrolyte membrane other than the perfluorocarbon sulfonic acid, materials used for an electrolyte membrane of the solid polymer type fuel cell can be used. For example, there may be a fluorine based ion exchange resin other than the perfluorocarbon sulfonic acid; a polystyrene based cationic exchange membrane having a sulfonic acid group or the like, namely, resins based on a hydrocarbon skeleton such as "polyolefin based" and having at least one kind of proton exchange group selected from a sulfonic acid group, a phosphonic acid group, a phosphoric acid group or the like; solid polymer electrolytes comprising complex of a basic polymer with a strong acid, such as ones disclosed by Japanese translation of PCT international application No. 11-503262 or the like, namely, ones prepared by doping a strong acid to a basic polymer such as polybenzimidazole, polypyrimidine, polybenzoxazole or the like.

The solid polymer electrolyte membrane using such electrolyte may be reinforced with the use of perfluorocarbon polymers of fibril-form, woven fabric-form, nonwoven fabric-form, porous sheet-form or the like, or may also be reinforced by coating a membrane surface with inorganic oxide or metal. Further, the perfluorocarbon sulfonic acid membrane can also be available from the market, for example, Nafion (product name; manufactured by: DuPont), Flemion (product name; manufactured by: Asahi Glass Co., Ltd.) or the like.

Though the electrolyte membrane in this embodiment is explained based on the perfluorocarbon sulfonic acid membrane which is one of solid polymer electrolyte membranes as one kind of proton conductive membranes, the electrolyte membrane to be used in the hollow-type fuel cell of the second embodiment is not particularly limited and may be an electrolyte membrane having proton conductivity or having another ion conductivity such as conductivity of hydroxide ion, oxide ion ($O^{2-}$) or the like. The electrolyte membrane with proton conductivity is not limited to the above described solid polymer electrolyte membrane, and it is possible to use: porous electrolyte plates infiltrated with phosphoric acid aqueous solution; proton conductive materials comprising porous glass; phosphoric acid salt glass after hydro-gelation; an organic-inorganic hybrid proton conductive membrane which is prepared by introducing functional groups having proton conductivity into a surface and pores of porous glass having nano-sized pores; electrolyte polymer which is reinforced with the use of inorganic metal fibers; or the like. As examples of electrolyte having another ion conductivity such as hydroxide ion, oxide ion ($O^{2-}$) or the like include materials containing ceramics.

Each electrode disposed inside and outside of the electrolyte membrane may be formed using conventional materials of the electrode for the solid polymer type fuel cell. Generally, as shown in FIG. 8, the electrode to be used is composed by laying a catalyst layer (catalyst layer 3a and catalyst layer 5a) and a gas diffusion layer (gas diffusion layer 3b and gas diffusion layer 5b) in this order from an electrolyte membrane side.

The catalyst layer contains catalyst particles, and may further contain a proton conductive material in order to improve an utilizing efficiency of the catalyst particles. Materials used as the electrolyte membrane can also be used as the proton conductive material. As the catalyst particle, preferably used is a catalyst particle in which a catalyst substance is carried on a conductive material such as carbonaceous material, for example, carbonaceous particles or carbonaceous fibers. Since the fuel cell of the present invention has the hollow-shaped cell, the fuel cell of the present invention can have a large electrode area per unit volume in comparison with a fuel cell having the plane type microcells. Therefore, even if a catalyst to be used is a catalyst having a catalyst activity not so higher than that of platinum, a fuel cell having a high power density per unit volume can be obtained.

The catalyst substance is not particularly limited, provided that it has a catalyst activity effective to the oxidation reaction of hydrogen in the anode or the reduction reaction of oxygen in the cathode. For example, the catalyst substance can be selected from metals such as platinum, ruthenium, iridium, rhodium, palladium, osmium, tungsten, lead, iron, chromium, cobalt, nickel, manganese, vanadium, molybdenum, gallium, aluminum or the like; or alloys based on these metals. Pt and alloys containing Pt and another metal such as Ru are preferable.

As the gas diffusion layer, a conductive material containing, as a major component, a carbonaceous material such as carbonaceous particles and/or carbonaceous fibers can be used. The size of the carbonaceous particles and carbonaceous fibers may be optimally selected in consideration of the dispersivity in a solution for producing the gas diffusion layer, the drainability of the gas diffusion layer to be obtained or the like. As to a structure and materials of the electrode, each of the electrodes disposed on the inner and outer surfaces of the electrolyte membrane may be the same or different from each other. In order to improve the drainability for water such as the generated water, the gas diffusion layer is preferably subject to a water repellent treatment in such manner that: the gas diffusion layer is infiltrate with any material such as polytetrafluoroethylene, polyvinylidene fluoride (PVDF), polytetrafluoroethylene, perfluorocarbon alkoxylalkane, ethylene-tetrafluoroethylene polymer, or mixtures based on them, or the like; or a water repellent layer is formed with the use of the materials mentioned above.

Methods to produce the hollow-shaped cell in which a pair of electrodes is disposed on the inner and outer surfaces of the hollow electrolyte membrane of the second embodiment are not particularly limited. For example, a method may be as follows: a hollow electrolyte membrane is provided; a solution containing an electrolyte and catalyst particles is applied on the inner and outer surfaces of the electrolyte membrane and dried to form catalyst layers; and a solution containing carbonaceous particles and/or carbonaceous fibers is applied on both catalyst layers and dried to form gas diffusion layers. In this method, the catalyst layer and the gas diffusion layer are formed so as to allow a hollow portion to be present at an inner side of the gas diffusion layer formed inside of the electrolyte membrane.

Alternatively, a method may also be as follows: a member (a tubular carbonaceous material) which contains a carbonaceous material such as the carbonaceous particles and/or carbonaceous fibers and is formed into a tubular form is used as a gas diffusion layer of an inner electrode (an anode); a solution containing an electrolyte and catalyst particles is applied on the outer surface of the gas diffusion layer and dried the same to form a catalyst layer, thereby an inner electrode layer is produced; next, a solution containing an electrolyte is applied on the outer surface of the catalyst layer and dried to form an electrolyte membrane layer; further, a catalyst layer of an outer electrode (a cathode) is formed on the outer surface of the electrolyte membrane layer; a solution containing a carbonaceous material is applied on the outer surface of the catalyst layer and dried to form a gas diffusion layer, thereby an outer electrode layer is produced.

A method to produce the hollow electrolyte membrane may not be particularly limited, and a commercial product of a tubular form electrolyte membrane can also be used. The electrolyte membrane may also be obtained in such manner that: a carbonaceous material such as carbonaceous particles and an epoxy based and/or a phenol based resin are dispersed in a solvent; and the mixture is formed into a tubular form followed by heat curing and baking.

Solvents to be used for forming the electrolyte membrane, the catalyst layer and the gas diffusion layer may be properly selected in accordance with materials to be dispersed and/or dissolved. Also, a coating method for forming each layer may be accordingly selected from various methods such as a spray coating, a brush coating or the like.

The hollow-shaped cell to be used for the hollow-type fuel cell of the second embodiment may not be limited to the structures exemplified above. Any layer other than the catalyst layer and the gas diffusion layer may be provided for the purpose of improving functions of the hollow-shaped cell. Though the hollow electrolyte membrane of the present embodiment is provided with the anode on the inside and the cathode on the outside, it may be provided with a cathode on the inside and an anode on the outside.

(Current Collector)

As shown in FIG. 8 and FIG. 9, the above-described electrodes may be provided with current collectors to remove charges generated on the electrodes to an external circuit. In the second embodiment of the present invention, the inner (anode side) current collector 2 is disposed at the inner side of the inner gas diffusion layer 3b. The outer (cathode side) current collector may be disposed at the outer side of the outer gas diffusion layer 5b though it is not illustrated in FIG. 8 and FIG. 9. As referred to hereinafter, it is preferable that the rod-like member 10 also functions as the outer current collector. There is no particular limitation to the shape of the cathode current collector disposed at the outer side of the outer gas diffusion layer 5b. For instance, the cathode current collector may be a metal wire wound in a spring-like shape or woven or a rod-like current collector.

The inner (anode side) current collector 2 is a columnar current collector, the outside diameter of which is contacted with the inner circumferential surface of the hollow-shaped cell. A channel 7 inside of the hollow, which is groove-like and extends in the axial direction (longitudinal direction) of the hollow-shaped cell, is formed on the outer circumferential surface of the body of the inner current collector so that the inner circumferential surface of the hollow-shaped cell is partially exposed to the channel 7 inside of the hollow. A hydrogen gas is supplied through the channel 7 inside of the hollow. If the columnar inner current collector 2 is made of conductive material having extremely high gas permeability, such a groove-like channel inside of the hollow to expose the inner electrode is not necessary. A closed gas channel penetrating the columnar inner current collector in the axial direction may be disposed or may not be disposed at all. The shape of the inner (anode side) current collector may not be particularly limited to the above-mentioned embodiment and may be columnar, wire-like, rod-like, linear or tubular if the inner (anode side) current collector is made of an electrical conductive material such as a spring-formed metal wire, a metal foil, a sheet material such as a metal sheet, carbon sheet or the like.

A metal to be preferably used for the inner (anode side) or the outer (cathode side) current collector may be at least one kind of metals selected from the group consisting of Al, Cu, Fe, Ni, Cr, Ta, Ti, Zr, Sm, In or the like, or may be an alloy based on these metals such as stainless steel. A surface thereof may further be coated with Au, Pt, a conductive resin or the like. From the viewpoint of excellent corrosion resistance, stainless or titanium is preferable among them. A gauge of the wire, a weave density, a diameter of a rod-like current collector or the like may not be particularly limited.

The current collectors may be fixed on the electrodes, if necessary, with a conductive adhesive material such as a carbon based adhesive, an Ag paste or the like.

(Rod-Like Member)

Figure 10:
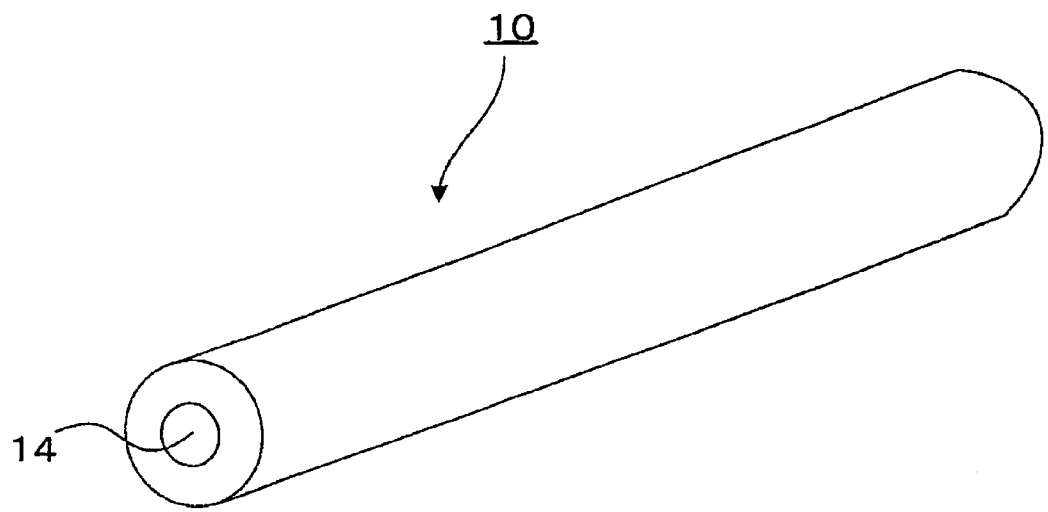
FIG. 10 is a perspective view showing one embodiment of a rod-like member of the present invention.

As shown in FIG. 10, the form of the rod-like member 10 of the second embodiment may not be particularly limited if the rod-like member is in a rod shape and can support the hollow-shaped cell 11 maintaining the shape of a spiral of the cell 11. Particularly from the viewpoint of supporting the hollow-shaped cell stably, controlling weight applied to the sealing portions as low as possible and running heating mediums (cooling and heating mediums) smoothly when the rod-like member is a heat exchanging member as hereinafter described, the rod-like member 10 is preferably in a linear shape. The section of the rod-like member 10 is preferably in the shape of a closed line curving outward such as a circle, ellipse or the like from the viewpoint that the hollow-shaped cell can be easily wound around the rod-like member.

As a material of the rod-like member 10, a material having corrosion resistance and strength so as to endure in operation environment of a fuel cell may be used. For instance, there may be gold, platinum, titanium, stainless steel or the like. If titanium or stainless steel is inferior in corrosion resistance, it is preferable, for example, that a surface of a cooling pipe made of the material is coated (plated) with a material having good corrosion resistance, for example, gold, platinum or the like.

Figure 11:
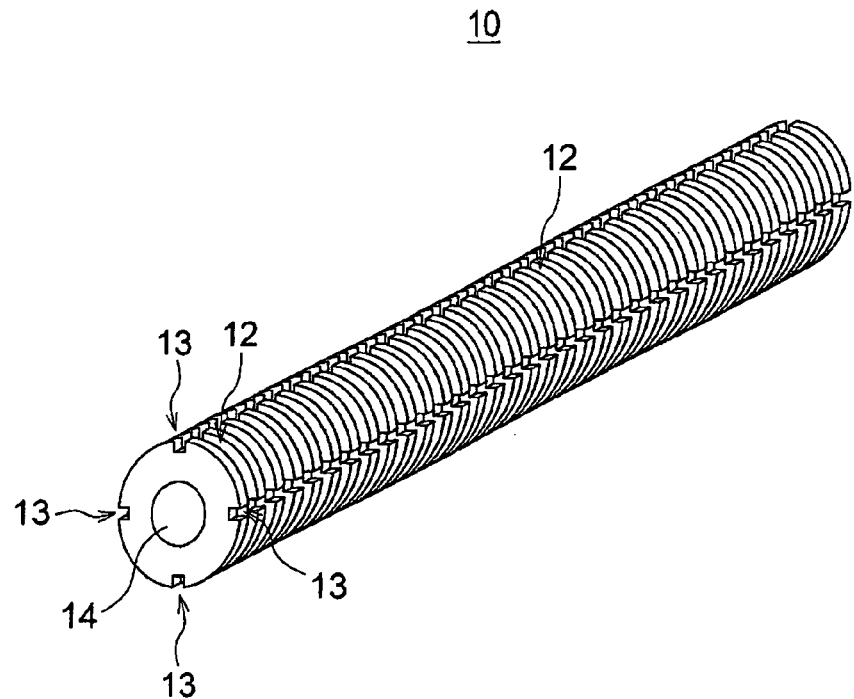
FIG. 11 is a perspective view showing one embodiment of a rod-like member of the present invention.

As shown in FIG. 11, on the outer circumferential surface of the rod-like member 10, grooves to be a lateral gas channel 12 and an axial gas channel 13 may be disposed respectively in the direction intersecting with and in the direction parallel to the axial direction of the rod-like member. Reaction gas is supplied over the outer circumferential surface of the hollow-shaped cell 11 through the gas channels 12 and 13. If the lateral gas channel 12 and the axial gas channel 13 are disposed on the outer circumferential surface of the rod-like member 10 as described, the reaction gas may be effectively supplied over the outer circumferential surface of the hollow-shaped cell 11 and reduction in generation performance due to insufficient supply of the reaction gas may be avoided. Particularly, in the case of densely winding the hollow-shaped cell 11 around the outer circumferential surface of the rod-like member 10, an effect which can be obtained by disposing the axial gas channel 13 on the rod-like member 10 increases.

The rod-like member 10 in such a form is provided with the gas channels in the direction parallel to the axial direction and also in the direction intersecting with the axial direction. Thereby, for example, droplet of water, which is generated as the result of water vapor generated at the hollow-shaped cell 11 and the rod-like member 10 contacting each other, is caught by the gas channel 12 and gathered at the axial gas channel 13. Then, the droplet of water gathered at the axial gas channel 13 is moved in the axial direction and can be released outside.

An inside diameter, an outside diameter, a length or the like of the rod-like member 10 may not be particularly limited. The outside diameter of the rod-like member 10 is preferably in the range of 0.5 to 3 mm, more preferably 0.5 to 1 mm, most preferably 0.5 to 0.8 mm. A rod-like member 10 having an outside diameter of less than 0.5 mm cannot form a sufficient internal hole which is to be a heating medium channel, particularly in the case that the rod-like member is a heat exchanging member to be hereinafter described. On the other hand, a rod-like member having an outside diameter of more than 3 mm has a problem that a size of the rod-like member is large.

A method of producing the rod-like member 10 may not be particularly limited. For example, there may be an extrusion molding method, wherein a melted material is poured in a mold of the rod-like member 10 followed by casting, or the like.

The rod-like member 10 is preferably a heat exchanging member (or a cooling pipe) to cool/heat the hollow-shaped cell 11. The hollow-shaped cell 11 formed in the shape of a spiral is linearly in contact with the rod-like member 10. By exchanging heat between the hollow-shaped cell 11 and the rod-like member 10, it is able to reduce the number of constituent members of a fuel cell and the size thereof (to downsize a fuel cell).

As shown in FIG. 10, a heat exchanging member (cooling pipe) 10 is a member having a heating medium channel 14 inside. When a cooling medium passes through the heat exchanging member 10, the heat exchanging member 10 functions as a cooling pipe to cool the hollow-shaped cell. On the other hand, the heat exchanging member 10 functions as a heating pipe to warm a hollow-shaped cell when a heating medium passes through the heat exchanging member 10.

If the heat exchanging member of the present invention is hollow-shaped and provided with the heating medium channel 14, a form thereof is not particularly limited. Particularly, the heat exchanging member 14 is preferably in a linear shape from the viewpoint of smooth flow of the heating medium (cooling or heating medium). A section of the heat exchanging member 14 is preferably in the shape of a closed line curving outward such as a circle, ellipse or the like so as to wind the hollow-shaped cell around the rod-like member easily. In addition to the heat exchanging member 10 having a single heating medium channel 14 inside, there may be embodiments such as a heat exchanging member having plurality of heating medium channels inside, a combination of heat exchanging members of which walls are integrated and so on.

As a material of the heat exchanging member, a material conventionally used for a heat exchanging member, which has a heat-conducting property, corrosion resistance and strength so as to endure operation environments of a fuel cell, may be used. For example, there may be gold, platinum, titanium, stainless steel or the like. If titanium or stainless steel is inferior in corrosion resistance, it is preferable, for example, that a surface of a cooling pipe made of the above material is coated (plated) with a material excellent in corrosion resistance, for example, gold, platinum or the like.

A heating medium such as water or the like flows through the heat medium channel 14. By disposing the hollow-shaped cell 11 around the heat exchanging member 10 wherein the heating medium flows in such a manner that the outer circumferential surface of the hollow-shaped cell 11 is spirally in contact with the outer circumferential surface of the heat exchanging member 10 linearly, a contacting length increases so that the hollow-shaped cell 11 can be cooled efficiently.

A form of the heating medium channel 14 may not be limited if the heating medium channel 14 is in a hollow shape. Particularly, the heating medium channel 14 is preferably in a linear shape so that the heating mediums can flow smoothly. A section of the heating medium channel 14 may be, for example, in the shape of a closed line curving outward such as a circle, ellipse or the like, or a rectangle but may not be limited thereto.

The heating medium which flows inside the heat exchanging member of the present invention may not be limited to water and may be a liquid such as ethylene glycol or the like, a gas or other heating mediums.

Also, the rod-like member 10 preferably functions as a current collector. Since the hollow-shaped cell 11 formed in the shape of a spiral is linearly in contact with the rod-like member 10. By collecting electrical power from the hollow-shaped cell 11 with the rod-like member 10, it is able to reduce the number of constituent members of a fuel cell and the size thereof (to downsize a fuel cell). In the case of allowing the rod-like member to function as a current collector, a material of the current collector which is explained in the description of the hollow-shaped cell may be used for the rod-like member.

Further, it is able to downsize the module furthermore with the rod-like member 10 which is a heat exchanging member and also functions as the current collector. When allowing the rod-like member to function as the heat exchanging member and the current collector, the rod-like member is in the shape of the above-described heat exchanging member and a material thereof may be appropriately selected to have a heat-conducting property, corrosion resistance and strength so as to endure operation environments of a fuel cell and a good electrical conducting property. Examples of materials having a good corrosion resistance, a heat-conducting property and an electrical conducting property may be gold, platinum, copper and so on. Copper is inferior in corrosion resistance to endure operation environments of a fuel cell. When using copper, the entire surface of the rod-like member 10 which is made of cooper is required to be coated (plated) with a material having a good corrosion resistance, a heat-conducting property and an electrical conducting property, for example, a noble metal such as gold, platinum or the like, to improve corrosion resistance. As a method of improving electrical conducting property of the rod-like member 10, in addition to the method using coating, there may be, for example, a method to dispose a material having a good electrical conducting property on the heat exchanging member 10. For example, a wire rod material made of a high conductive material may be embedded in the heat exchanging member 10, the heat exchanging member 10 may have a multilayer structure, a core of which is the axis of the hollow shape, wherein layers of the heat exchanging member 10 at the center side are constituted by high conductive materials or the like.

In the case of allowing the rod-like member 10 to function as the heat exchanging member and the current collector, an insulating layer may be disposed on the inner circumferential surface of the rod-like member 10 to prevent electrical leakage to the heating medium flowing in the heating medium channel 14, if necessary. A method to dispose the insulating layer may not be particularly limited. For example, there may be a method to coat the inner circumferential surface of the rod-like member with a material having a good electrical insulating property, heat-conducting property and corrosion resistance, for instance, a fluorine resin such as a polytetrafluoroethylene resin (PTFE), a tetrafluoethylene-perfluoro (alkoxy vinyl ether) copolymer resin (PFA) or the like, a method to provide a tubular member having a good electrical insulating property, heat-conducting property and corrosion resistance, for instance, a pipe made of silicon rubber, a tube made of silicon rubber having a high heat-conducting property, in close contact with the inner circumferential surface of the rod-like member, or the like.

(Hollow-Type Fuel Cell of the Second Embodiment)

Figure 12:
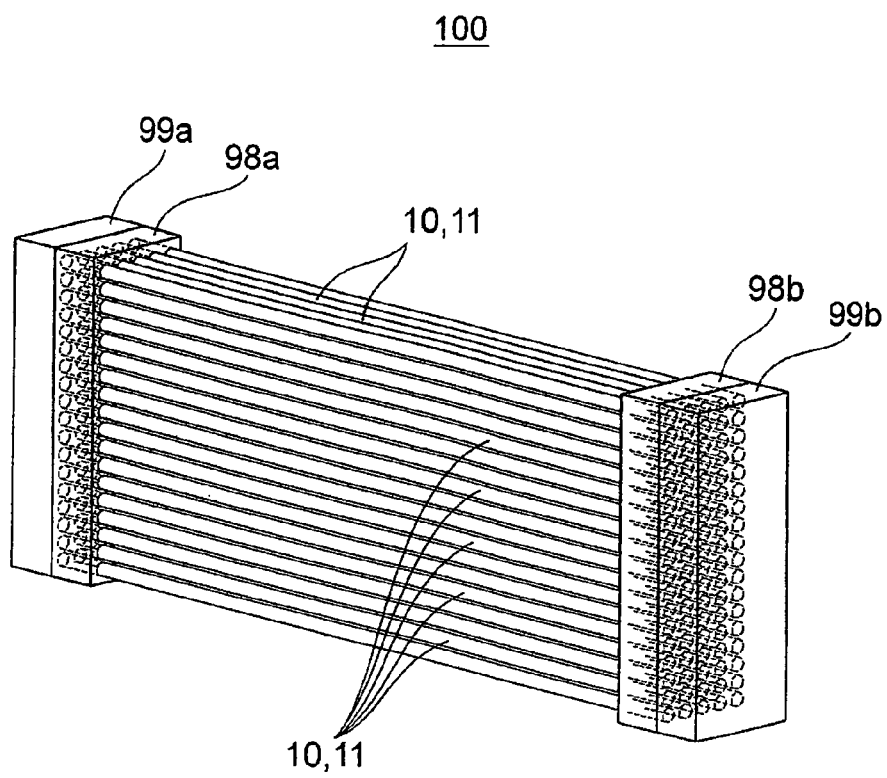
FIG. 12 is an external view schematically showing one embodiment of a module (a group of hollow-shaped cells) of the present invention.

FIG. 12 is an external view schematically showing a module 100, which is a group of hollow-shaped cells comprising plural integral members including the hollow-shaped cell 11 of the second embodiment and the rod-like member 10 which functions as the heat exchanging member and the current collector. At both ends of the module 100, gas manifolds 98a and 98b to supply hydrogen gas into hollows of hollow-shaped cells 11, 11 . . . and cold water manifolds 99a and 99b to supply a heating medium into rod-like members 10, 10 . . . are provided. Further, current collector members (not shown) to collect electric charge generated at each hollow-shaped cell 11, 11 . . . is provided. Hydrogen supplied to the module 100 via the gas manifold on the inlet side (for example, 98a) is used for an electrochemical reaction while passing through the channels 14, 14 . . . in the hollow of each hollow-shaped cell 11, 11 . . . . Hydrogen or the like which are not used for the electrochemical reaction is collected via the gas manifold on the outlet side (for example, 98b). Also, in the module 100, one of the current collector members is electrically connected to the inner (anode side) current collectors 3, 3 . . . of the hollow-shaped cells 11, 11 . . . and the other is electrically connected to the rod-like members 10, 10 . . . , which function also as current collectors. Thereby, electric charge generated at the hollow-shaped cells 11, 11 . . . is collected.

Figure 13:
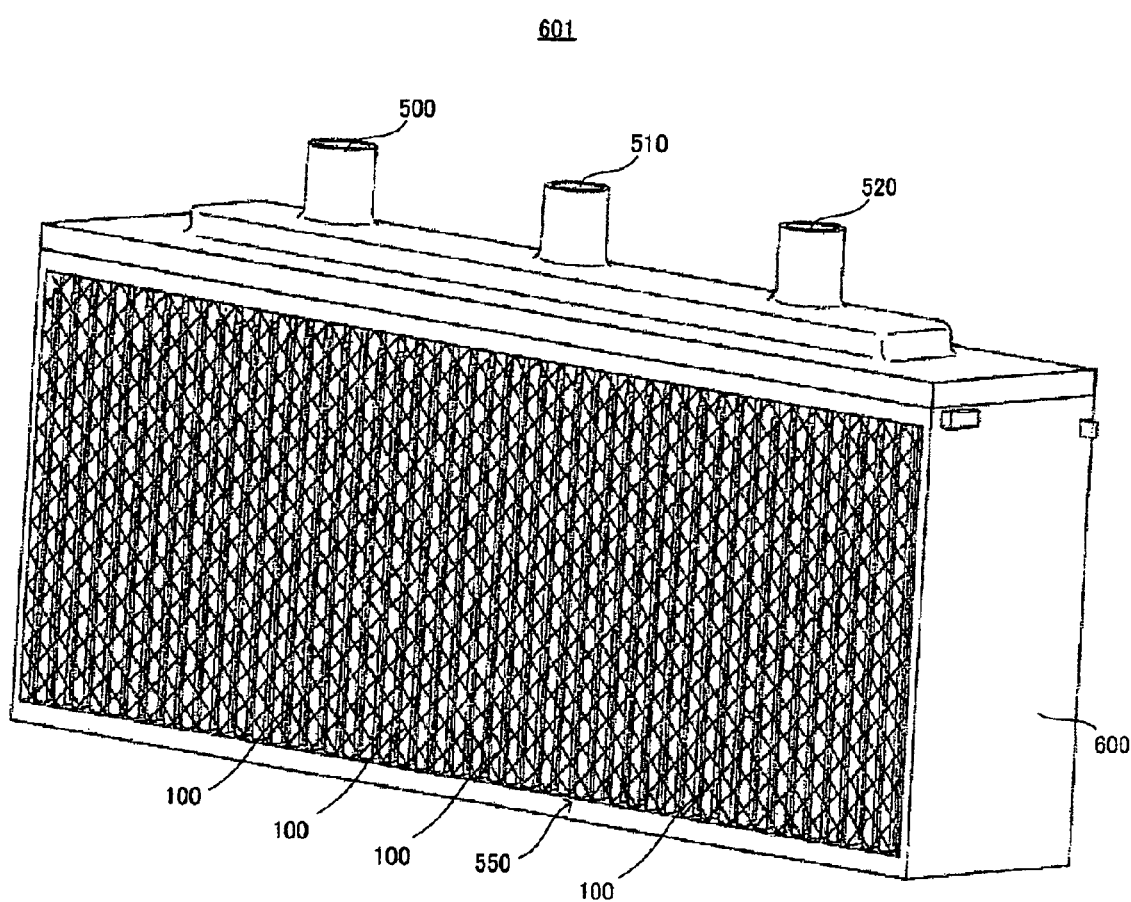
FIG. 13 is an external view schematically showing one embodiment of a fuel cell comprising a module (a group of hollow-shaped cells) of the present invention.
Figure 14:
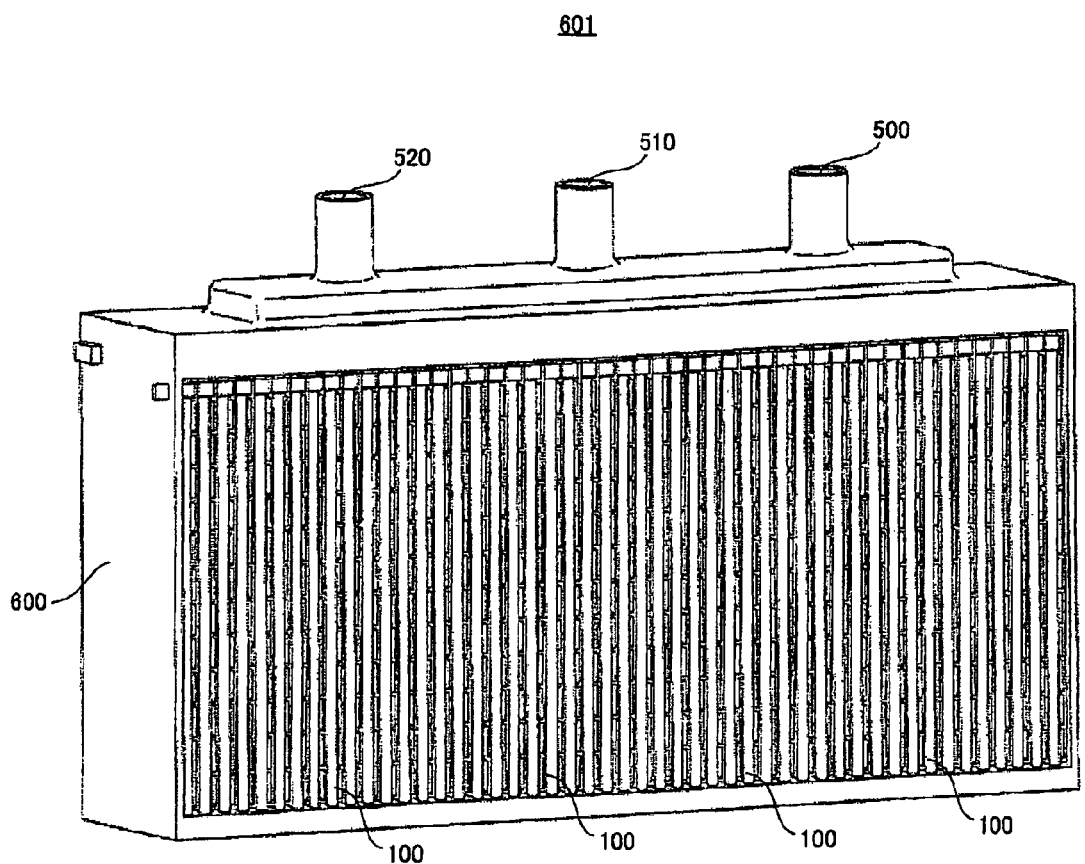
FIG. 14 is an external view schematically showing one embodiment of a fuel cell comprising a module (a group of hollow-shaped cells) of the present invention.

Also, as shown in FIG. 13 and FIG. 14, a cartridge 600 stores plurality of modules 100 which are connected in series or parallel so as to be a hollow-type fuel cell 601 (hereinafter, it may be simply referred to as a fuel cell). FIG. 14 shows a reverse side of the fuel cell shown in the FIG. 13, wherein a latticed member which is usually disposed on a side surface of the fuel cell is excluded from FIG. 14 to clarify the internal structure of the fuel cell.

On the top surface of the cartridge 600, a reaction gas (for instance, hydrogen) inlet 500, a reaction gas outlet 510 and a cooling water inlet/outlet 520 are provided. On a pair of side surfaces of the cartridge 600 which are facing each other, a latticed member 550 is provided. If gas to be supplied into the reaction gas inlet 500 is hydrogen, air is supplied to the fuel cell 601 in the direction through the latticed member 550. In FIG. 13, air supplied through the latticed member 550 is discharged from the other latticed member side, wherein the other latticed member is provided on the back surface of the cartridge 600 (not shown in FIG. 14). The module 100 generates heat as the fuel cell 601 of such an embodiment operates. The temperature is controlled by a method such as, for example, allowing water, which is supplied to/discharged from the cooling water inlet/outlet 520 to flow through cooling pipes provided on the module 100, or the like.

As explained above, the fuel cell 601 of the second embodiment is provided with plurality of above-described modules 100. It is possible to avoid damage to the sealing portions of the fuel cell 601 by increasing the length of each hollow-shaped cell of the modules 100 and reducing the number of the sealing portions per cell volume.

As aforementioned, the present invention is explained in detail exemplifying two embodiments: the first embodiment wherein the rod-like member is not an essential element and the second embodiment wherein the rod-like member is an essential element. However, the present invention is not limited to the embodiments. The above-mentioned embodiments are solely exemplifications. Embodiments having a structure substantially same as that of the technical idea disclosed in claims of the present invention and providing similar effect are included in the technical scope of the present invention.

INDUSTRIAL APPLICABILITY

As described above, the membrane electrode assembly for a hollow-type fuel cell of the present invention and the hollow-type fuel cell using thereof have a large reaction area per unit volume for generation, are easy to be downsized and are particularly suitable to be used as portable or mobile batteries (power supplies).

The invention claimed is:

1. A hollow-type fuel cell comprising:
    a rod-like member, and
    a hollow-shaped cell which is disposed in a spirally winding manner around an outside of the rod-like member and comprises a hollow-shaped membrane electrode assembly comprising a solid electrolyte membrane in a hollow shape, an outer electrode layer formed on an outer circumferential surface of the solid electrolyte membrane, and an inner electrode layer formed on an inner circumferential surface of the solid electrolyte membrane,
    wherein first gas channel grooves oriented parallel to an axial direction of the rod-like member and second gas channel grooves oriented to intersect the first channel grooves of the rod-like member are separately formed on an outer circumferential surface of the rod-like member.

2. A hollow-type fuel cell according to claim 1, wherein a contact length of the hollow-shaped cell and the rod-like member is 1.5 to 10 times longer than the total length of the rod-like member.

3. A hollow-type fuel cell according to claim 1, wherein the rod-like member is a heat exchanging member to control a temperature of the hollow-shaped cell.

4. A hollow-type fuel cell according to claim 1, wherein the rod-like member has an electrical conducting property and functions as a current collector of an outer electrode layer formed on the outer circumferential surface of the solid electrolyte membrane.

5. A hollow-type fuel cell according to claim 1, wherein the rod-like member is a heat exchanging member and functions as a current collector.

6. A hollow-type fuel cell according to claim 5, wherein a heating medium flows inside the heat exchanging member and at least a part of an inner surface of the heat exchanging member which contacts the heating medium is made of a material having an electrical insulating property.

7. The hollow-type fuel cell according to claim 1, wherein an outer current collector is disposed on an outer circumferential surface of the outer electrode layer and an inner current collector is disposed on an inner circumferential surface of the inner electrode layer.

8. The hollow-type fuel cell according to claim 1, wherein the hollow-shaped solid electrolyte membrane is a tubular solid electrolyte membrane.

\* \* \* \* \*